Dec. 20, 1955  R. W. McCLENNY  2,727,640
STACK LIFTER WORK SUPPORT
Filed Jan. 7, 1955  2 Sheets-Sheet 1

INVENTOR.
ROBERT W. McCLENNY
BY
McMorrow, Berman & Davidson
ATTORNEYS

Dec. 20, 1955  R. W. McCLENNY  2,727,640
STACK LIFTER WORK SUPPORT
Filed Jan. 7, 1955  2 Sheets-Sheet 2

INVENTOR.
ROBERT W. McCLENNY
BY
McMorrow, Berman & Davidson
ATTORNEYS

United States Patent Office 2,727,640
Patented Dec. 20, 1955

2,727,640

STACK LIFTER WORK SUPPORT

Robert W. McClenny, Suffolk, Va.

Application January 7, 1955, Serial No. 480,402

3 Claims. (Cl. 214—140)

This invention relates to rake attachments for tractors, and more particularly to an improved rake attachment for a tractor of the type having a pair of rearwardly projecting rotary lift arms and a resilient stabilizer arm located between said lift arms.

A main object of the invention is to provide a novel and improved rake and lifting attachment for a tractor, said attachment being simple in construction, being easy to install on a tractor, and providing a means of lifting and transporting loads of harvested material, and similar material in an efficient and rapid manner.

A further object of the invention is to provide an improved rake and load lifting attachment for a tractor of the type having a pair of rearwardly projecting rotary lift arms and a resilient stabilizer arm located between said lift arms, said attachment being inexpensive to fabricate, being rugged in construction, being arranged so that it can handle loads of material which are distributed over spaced areas, and being provided with means whereby a portion of the load may be transported in an elevated position while the apparatus is employed to pick up another load of material which may be located at a point a substantial distance from the location of the original load of material picked up by the apparatus.

Further objects and advantages of the invention will become apparent from the following description and claims, and from the accompanying drawings, wherein:

Figure 1:
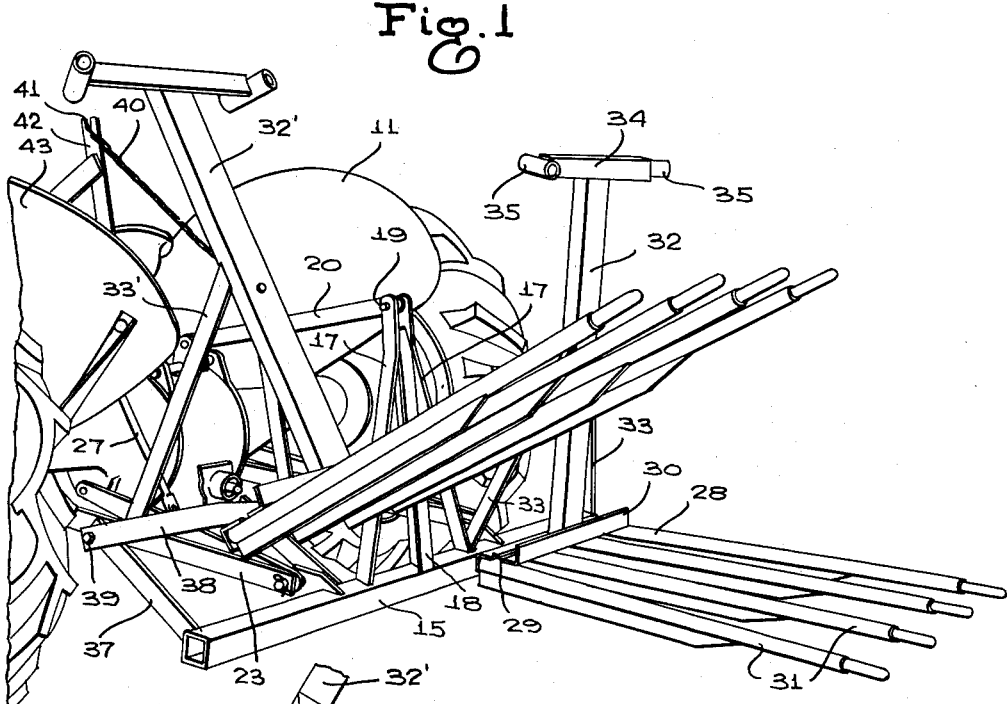
Figure 1 is a perspective view of the rear portion of a conventional tractor equipped with an improved rake attachment constructed in accordance with the present invention, one section of the attachment being shown in elevated position.

Referring to the drawings, 11 designates a conventional farm tractor of the type having a pair of rotary lift arms 12 and a resilient stabilizing arm 13 located between the lift arms 12. Designated generally at 14 is an improved rake attachment according to the present invention, said attachment comprising a transverse beam 15, which may comprise a hollow square tube, as shown. Rigidly secured on the intermediate portion of the beam 15 is an upstanding frame 16, which may comprise the upwardly and inwardly inclined brace bars 17, 17 which are rigidly connected at their top end portions to an intermediate upwardly extending bar member 18, the lower ends of the bar members 17, 17 and 18 being rigidly secured, as by welding, to the beam 15. Pivotally connected at 19 between the top ends of the brace bars 17, 17 is a forwardly extending link bar 20 which is pivotally connected at 21 to a yoke member 22 secured to the end of the resilient stabilizing bar 13. It will be understood that the yoke member 22 is a conventional element, and the yoke member 22, the stabilizer bar 13 and the connections thereof to the tractor frame form no part of the present invention. It will be further understood that the link arm 20 provides a link connection of the top end of the frame 16 to the tractor frame, said link connection being located between the lift arms 12, 12.

Designated at 23, 23 are respective pairs of rearwardly extending link bars pivotally connected to the tractor frame, for example at 24, and converging rearwardly. The rear ends of the arms 23, 23 are respectively pivotally connected to lugs 25 secured on the beam 15 on opposite sides of the frame 16, by pivot bolts 26. The intermediate portions of the respective inner link arms 23 are connected by respective link rods 27, 27 to the ends of the respective lift arms 12, 12, providing a link means connecting the beam 15 to the lift arms 12, whereby elevation of the lift arms 12 causes the beam 15 to be elevated. As will be further apparent, the upward rotation of the lift arms 12 causes the beam 15 to be rotated in a clockwise direction, as viewed in Figure 2, as it is elevated.

Rigidly secured to one end portion of the beam 15 is a lift fork assembly, shown generally at 28, said fork assembly comprising the end transverse bar member 29, the transverse bar member 30 which is spaced rearwardly from the end transverse bar member 29, and the rearwardly divergent tine elements 31 which are rigidly secured to the transverse bar members 29 and 30. As shown, the transverse bar member 29 comprises an angle bar having a depending vertical flange, the ends of the tine elements 31 being received beneath the horizontal flange of the bar member 29 and being rigidly secured, as by welding, or the like, in the angle bar. The transverse bar member 30 comprises an angle bar with its vertical flange directed upwardly and with its horizontal flange rigidly secured, as by welding, or the like, on the tine elements 31.

Rigidly secured to the intermediate portion of the transverse bar member 30 is the upstanding channel-shaped post member 32 which is suitably braced by means of inclined strut bars 33, 33 connecting the intermediate portions of respective flanges of the post member 32 to points on the beam 15 spaced on opposite sides of the post member 32. Rigidly secured to the top end of the post member 32 is the transversely extending angle bar 34, and rigidly secured to the ends of the angle bar 34 are the respective sleeve elements 35, 35 adapted to receive guard bars, said sleeve elements 35, 35 being arranged substantially parallel to the outer tine elements 31 of the rake, whereby said guard bars will be supported in parallel relationship to said outer tine elements.

The angle bar 29 is rigidly secured to the rear vertical face of the transverse beam 15, and as above explained, the brace bars 33 are also rigidly connected to the transverse beam 15, whereby the fork assembly 28 is rigidly connected to the beam 15.

Figure 4:
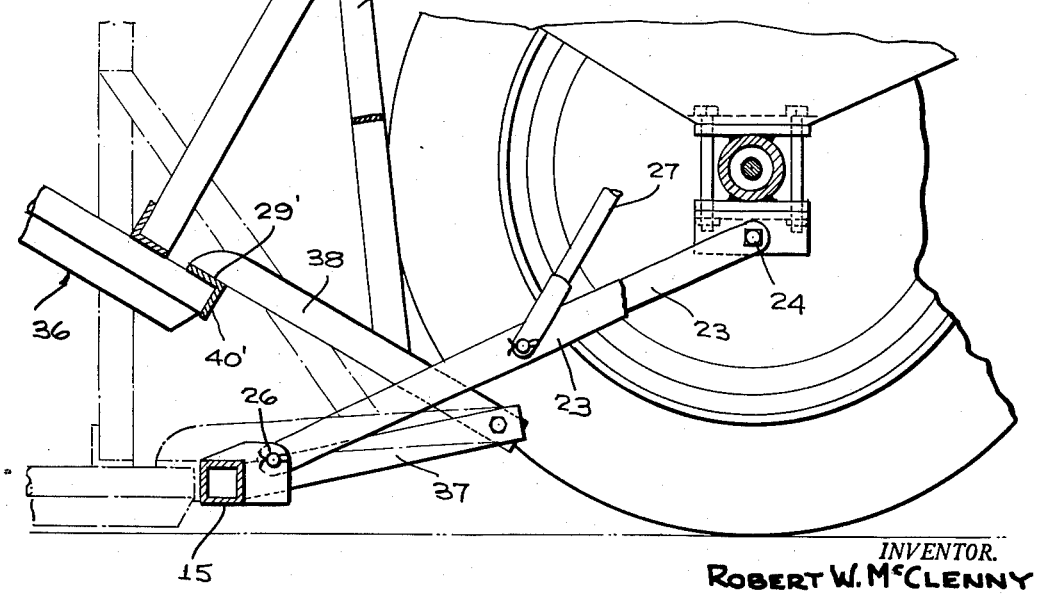
Figure 4 is an enlarged vertical cross sectional view taken on the line 4—4 of Figure 3.

Designated at 36 is a second fork assembly which is similar in construction to the fixed fork assembly 28 but which is rotatably connected to the beam on the side of the beam opposite the fixed fork assembly 28. Thus, spaced forwardly extending bars 37, 37 are rigidly secured to the forward face of the beam 15, and forwardly extending bars 38, 38 are rigidly secured to the respective sides of the bottom frame of the fork assembly 36, the respective arms 37 being pivotally connected with the respective arms 38 at the forward ends of the arms, as shown at 39. As shown in Figure 4, the arms 37 are inclined forwardly and upwardly from the transverse beam 15 when the beam is in its normal, lowered position, shown in Figure 4. When the rotatable fork assembly 36 is in its normal lowered position, the vertical flange 40' of its end transverse angle bar 29' is in abutment with the rear vertical face of the transverse beam 15, and the arms 38 overlie the top face of the beam 15, thus supporting the rotatable fork assembly 36 in its lowered position, wherein the tine elements of the rotatable fork assembly 36 are substantially horizontal, and are coplanar with the tine elements 31 of the fixed fork assembly 28.

Figures 2, 3:
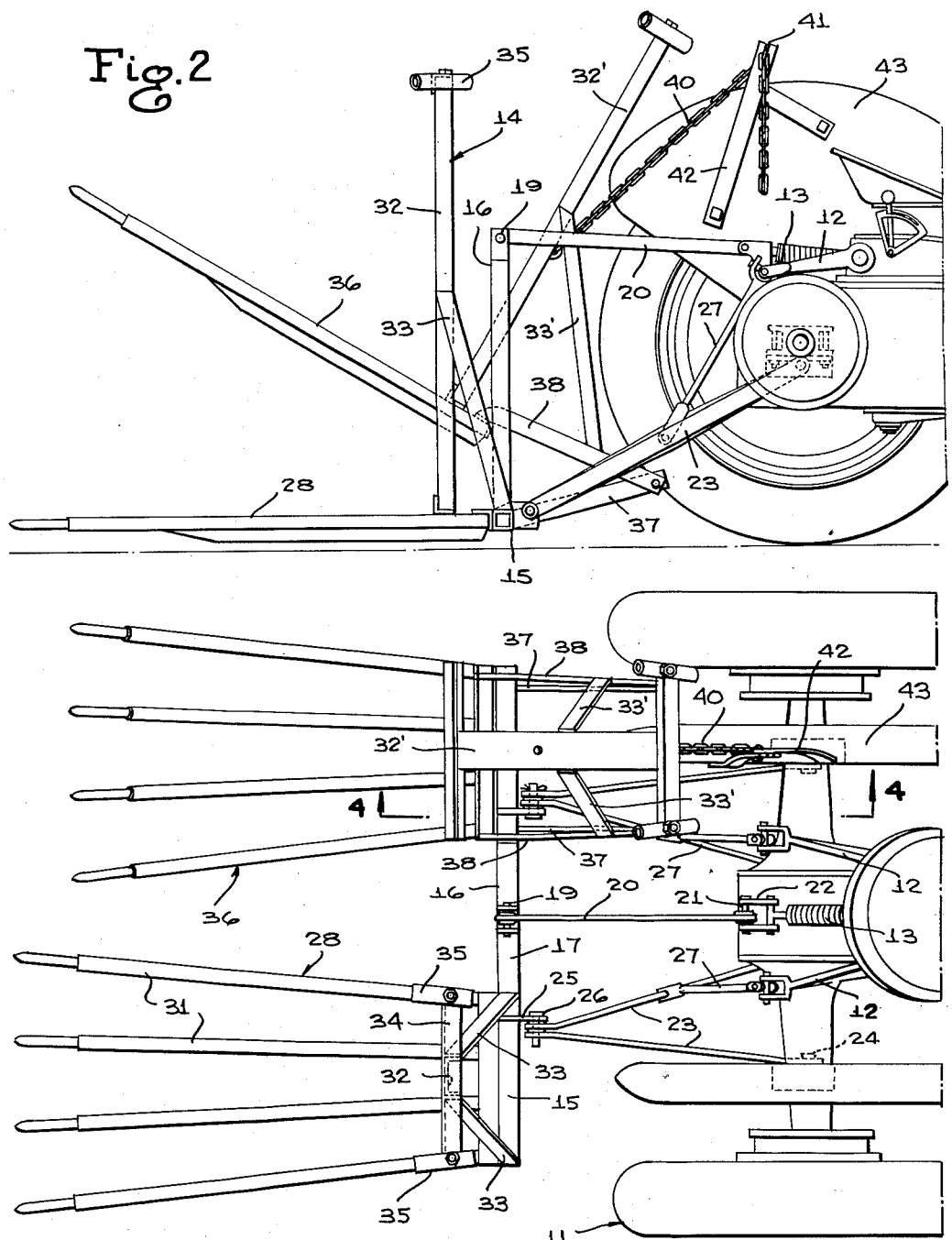
Figure 2 is a side elevational view of the structure of Figure 1.
Figure 3 is a top plan view of the structure of Figure 1.

The rotatable fork assembly 36 has the upstanding post element 32' comprising a channel bar similar to the channel bar 32 of the fixed fork assembly 28, the intermediate portion of the post member 32' being braced to the arms 38 by strut bars 33' connecting the intermediate portions of the sides of the channel bar 32' to the arms 38 in the manner shown in Figures 1 and 3. Connected to the intermediate portion of the channel member 32' is a chain 40 which may be lockingly engaged in a notch 41 provided in the end of an upstanding locking bar 42 rigidly secured to one of the fenders 43 of the tractor, whereby the fork assembly 36 may be at times supported in an elevated position while the beam 15 and the fixed fork assembly 28 is in a lowered position, for example, as shown in Figure 1.

Thus, in operation, a first load of harvested material, or the like, may be gathered on the fork assembly 36 with the tine elements thereof in their lowered horizontal positions, after which, the beam 15 may be elevated, to elevate the fork assembly 36. The chain 40 may then be lockingly engaged in the notch 41 of the upstanding bar 42, after which the beam 15 and the fixed fork assembly 28 may be lowered to allow the apparatus to be employed for gathering up a second load of material, spaced from the original load of material, employing the fork assembly 28. After the second load of material has been gathered, the beam 15 may be again elevated, whereby the two loads may be simultaneously transported by the tractor to their intended destination.

While a specific embodiment of an improved rake attachment for a tractor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A rake attachment for a tractor of the type having a pair of rearwardly projecting rotary lift arms and a resilient stabilizing arm comprising a transverse beam, an upstanding frame on the intermediate portion of said beam, a link arm pivotally connected to the top of said frame and adapted to be connected to said stabilizing arm, link means connecting said beam to said lift arms, a first rake rigidly secured to one end portion of said beam and projecting rearwardly therefrom, a second rake rotatably secured to the other end portion of said beam in side-by-side relation to said first rake for rotation around a transverse axis spaced forwardly from said beam, said second rake including an upstanding post member, and means for selectively connecting said post member to a portion of the tractor, whereby said second rake may be supported at an elevated position when said beam and first rake are lowered.

2. A rake attachment for a tractor of the type having a pair of rearwardly projecting rotary lift arms and a resilient stabilizing arm comprising a transverse beam, an upstanding frame on the intermediate portion of said beam, a link arm pivotally connected to the top of said frame and adapted to be connected to said stabilizing arm, link means connecting said beam to said lift arms, a first rake rigidly secured to one end portion of said beam and projecting rearwardly therefrom, forwardly extending bar means rigidly secured to the other end portion of said beam, a second rake secured to the forward portion of said forwardly extending bar means in side-by-side relation to said first rake for rotation around a transverse axis spaced forwardly from said beam, said second rake including an upstanding post member, and means for selectively connecting said post member to a portion of the tractor, whereby said second rake may be supported in an elevated position when said beam and first rake are lowered.

3. A rake attachment for a tractor of the type having a pair of rearwardly projecting rotary lift arms and a resilient stabilizing arm located between said lift arms, said attachment comprising a transverse beam, an upstanding frame on the intermediate portion of said beam, a link arm pivotally connected to the top of said frame and adapted to be connected to said stabilizing arm, link means connecting said beam to said lift arms, a first rake rigidly secured to one end portion of said beam and projecting rearwardly therefrom, forwardly extending bar means secured to the other end portion of said beam, a second rake, forwardly extending arms rigidly secured to said second rake and pivotally connected at their ends to the forward portion of said bar means, whereby the second rake is supported in side-by-side relation to said first rake for rotation around a transverse axis spaced forwardly from said beam, said second rake including an upstanding post member, and means for selectively connecting said post member to a portion of the tractor, whereby said second rake may be supported in an elevated position when said beam and first rake are lowered.

No references cited.